(12) United States Patent
Hirakawa et al.

(10) Patent No.: US 7,623,280 B2
(45) Date of Patent: Nov. 24, 2009

(54) OPTICAL SCANNING DEVICE AND IMAGE FORMING APPARATUS

(75) Inventors: Makoto Hirakawa, Hiratsuka (JP); Yoshinori Hayashi, Kawasaki (JP); Daisuke Ichii, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/107,379

(22) Filed: Apr. 22, 2008

(65) Prior Publication Data

US 2008/0266633 A1 Oct. 30, 2008

(30) Foreign Application Priority Data

Apr. 24, 2007 (JP) ............... 2007-114230

(51) Int. Cl.
G02B 26/08 (2006.01)

(52) U.S. Cl. .................................. 359/204.1

(58) Field of Classification Search ......... 359/204–208
See application file for complete search history.

(56) References Cited

U.S. PATENT DOCUMENTS

| | | | |
|---|---|---|---|
| 6,462,853 B2 | 10/2002 | Hayashi | |
| 6,788,444 B2 | 9/2004 | Suzuki et al. | |
| 7,068,296 B2 | 6/2006 | Hayashi et al. | |
| 7,106,483 B2 | 9/2006 | Hayashi et al. | |
| 7,218,432 B2 | 5/2007 | Ichii et al. | |
| 7,253,937 B2 | 8/2007 | Ueda et al. | |
| 7,271,823 B2 | 9/2007 | Izumi et al. | |
| 7,271,824 B2 | 9/2007 | Omori et al. | |
| 2006/0077500 A1 | 4/2006 | Hayashi et al. | |
| 2006/0232659 A1 | 10/2006 | Hayashi et al. | |
| 2006/0245009 A1 | 11/2006 | Akiyama et al. | |
| 2006/0284968 A1 | 12/2006 | Hayashi et al. | |
| 2006/0285187 A1* | 12/2006 | Ichii et al. ............... | 359/205 |
| 2007/0030538 A1 | 2/2007 | Hirakawa et al. | |
| 2007/0058255 A1 | 3/2007 | Imai et al. | |
| 2007/0211324 A1 | 9/2007 | Sakai et al. | |
| 2007/0211325 A1 | 9/2007 | Ichii | |
| 2007/0215800 A1 | 9/2007 | Miyatake et al. | |
| 2007/0253047 A1 | 11/2007 | Ichii et al. | |
| 2007/0253048 A1 | 11/2007 | Sakai et al. | |
| 2007/0297036 A1* | 12/2007 | Nakamura et al. .......... | 359/226 |
| 2008/0024849 A1 | 1/2008 | Hayashi et al. | |
| 2008/0025759 A1 | 1/2008 | Ichii et al. | |
| 2008/0055672 A1 | 3/2008 | Watanabe et al. | |

(Continued)

FOREIGN PATENT DOCUMENTS

JP 2004-287292 10/2004

(Continued)

OTHER PUBLICATIONS

U.S. Appl. No. 12/020,292, filed Jan. 25, 2008, Miyatake, et al.

*Primary Examiner*—Euncha P Cherry
(74) *Attorney, Agent, or Firm*—Oblon, Spivak, McClelland, Maier & Neustadt, L.L.P.

(57) ABSTRACT

An optical scanning device includes a light source configured to emit light beams, a deflector to deflect the light beams emitted from the light source, a first optical assembly which is positioned upon a light path of the light beams traveling from the light source to the deflector and which forms an image with the light beams emitted from the light source in a sub scanning direction in a vicinity of the deflector, and a second optical assembly to form the image upon a surface to be scanned with the light beams deflected by the deflector. A principal ray of two of the light beams incident to the first optical assembly, which are located at each respective terminus in the sub scanning direction, are set so as to advance so as either to remain mutually parallel to or converge with one another after passing through the first optical assembly.

14 Claims, 7 Drawing Sheets

U.S. PATENT DOCUMENTS

| | | |
|---|---|---|
| 2008/0055690 A1 | 3/2008 | Nakamura et al. |
| 2008/0055692 A1 | 3/2008 | Saisho et al. |
| 2008/0068689 A1 | 3/2008 | Saisho et al. |
| 2008/0068690 A1 | 3/2008 | Ichii |
| 2008/0068693 A1 | 3/2008 | Hayashi et al. |

FOREIGN PATENT DOCUMENTS

| | | |
|---|---|---|
| JP | 2005-250319 | 9/2005 |
| JP | 2008-107554 | 5/2008 |
| JP | 2008-197187 | 8/2008 |

* cited by examiner

LENGTH OF LIGHT PATH EMANATING FROM CYLINDRICAL LENS (mm)

OPTICAL SCANNING DEVICE AND IMAGE FORMING APPARATUS

CROSS REFERENCE TO THE RELATED APPLICATION

The present application is based on and claims priority from Japanese Application Number 2007-114230, filed on Apr. 24, 2007, the disclosure of which is hereby incorporated by reference herein in its entirety.

BACKGROUND OF THE INVENTION

1. Field of the Invention

The present invention relates to an optical scanning device and an image forming apparatus, and more specifically, relates to an optical scanning device that uses a light beam to scan a surface to be scanned, and an image forming apparatus that includes the optical scanning device.

2. Description of the Related Art

An image forming apparatus that employs a laser is widely employed in an electrophotographic recording of an image. In such a circumstance, a method wherein the image forming apparatus includes an optical scanning device, and forms a latent image by causing a photosensitive drum to rotate, while employing a polygon scanner, for instance, a polygon mirror, to scan a laser light in an axial direction of the drum, is typical. In such an electrophotography sector, what is demanded of the image forming apparatus is an increased density of the image, in order to improve a quality of the image, and a higher speed in an output of the image, in order to improve an operability of the image forming apparatus.

A multi-beam splitting of a light beam that is emitted from a light source is one method of balancing the increased density with the higher speed.

For instance, Japanese Patent Laid Open No. 2004-287292 discloses an optical scanning device, comprising a first substrate whereupon is incorporated a light emitting element and a driving circuit thereof, and which is attached to a housing that is anchored to a main body of a image forming apparatus, a second substrate whereupon is incorporated a connector that connects a harness from the main body of the image forming apparatus, and which is attached to the housing, physically separate from the first substrate, a terminal of the first substrate, a terminal of the second substrate, and a connection material that is capable of being elastically transformed, and which is electrically connected to the terminal of the first substrate and the terminal of the second substrate. The optical scanning device employs a surface emitting laser array as a multi-beam light source.

As another instance, Japanese Patent Laid Open No. 2005-250319 discloses a light source device that is configured by combining a plurality of an assembly of a light source wherein a plurality of light emitting points that are capable of being individually modulated are positioned two-dimensionally, and a coupling lens that couples a divergent light beam that is emitted from the light source. The light source device employs a vertical cavity surface emitting laser array as the light source.

It is to be noted, however, that when scanning a surface to be scanned with a plurality of the light beam, a beam pitch that relates to a sub or vertical scanning direction of the surface to be scanned (also to be referred to hereinafter as "sub scan beam pitch" for purposes of ease of designation) may deviate from a desired value, for instance, a design value, as a consequence of such as an error in a location of an optical element that is positioned between the light source and the surface to be scanned, or an error in a shape of the optical element thus positioned. A hazard is present wherein the deviation of the sub scan beam pitch may have a negative effect on the quality of the image with regard to a further increased density of the image that is anticipated hereinafter.

SUMMARY OF THE INVENTION

According to an aspect of the present invention, there is provided an optical scanning device that is capable of reducing the deviation of the sub scan beam pitch.

According to still another aspect of the present invention, there is provided a image forming apparatus that is capable of forming a high quality image at a high speed.

In order to achieve the first objective, an optical scanning device according to a first embodiment of the present invention comprises a light source that emits a plurality of a light beam, a deflector that deflects the light beam that is emitted from the light source, a first optical assembly that is positioned upon a light path of the light beam that is directed from the light source to the deflector and causes the light beam that is directed from the light source to form an image in an immediate vicinity of the deflector and with regard to the sub scan direction, and a second optical assembly that causes the light beam that is deflected by the deflector to form the image upon the surface to be scanned.

Two principal rays, from among the plurality of the light beam that is projected upon the first optical assembly, and which are located at either terminus with regard to the sub scan direction, mutually advance either in parallel or so as to converge upon one another after passing through the first optical assembly, and do not intersect between the optical element wherein a positive power of the sub scan direction with regard to the second optical assembly is at a maximum, and the first optical assembly.

In the present circumstance, the two principal rays, from among the plurality of the light beam that is projected upon the first optical assembly, and which are located at either terminus with regard to the sub scan direction, are set so as to mutually advance either in parallel or so as to converge upon one another after passing through the first optical assembly, and so as not to intersect between the optical element wherein the positive power of the sub scan direction with regard to the second optical assembly is at the maximum, and the first optical assembly. In such a circumstance, it is possible to reduce a fluctuation in the sub scan beam pitch that may result from the error of the location of the optical element that is positioned between the light source and the surface to be scanned, or the error in the shape of the optical element thus positioned. As a result thereof, it is possible to reduce the deviation of the sub scan beam pitch.

In order to achieve the second objective, a image forming apparatus according to the first embodiment of the present invention comprises, at a minimum, one image retention medium, and, at a minimum, one optical scanning device, which scans a light beam wherein is contained an image information with regard to the minimum of one image retention medium, wherein the optical scanning device comprises the configuration described herein.

It is possible to form the high quality image at the high speed by way of the configuration thus described.

DETAILED DESCRIPTION OF THE PREFERRED EMBODIMENTS

Following is a detailed description of preferred embodiments of the present invention, with reference to the accompanying drawings.

Figure 1:
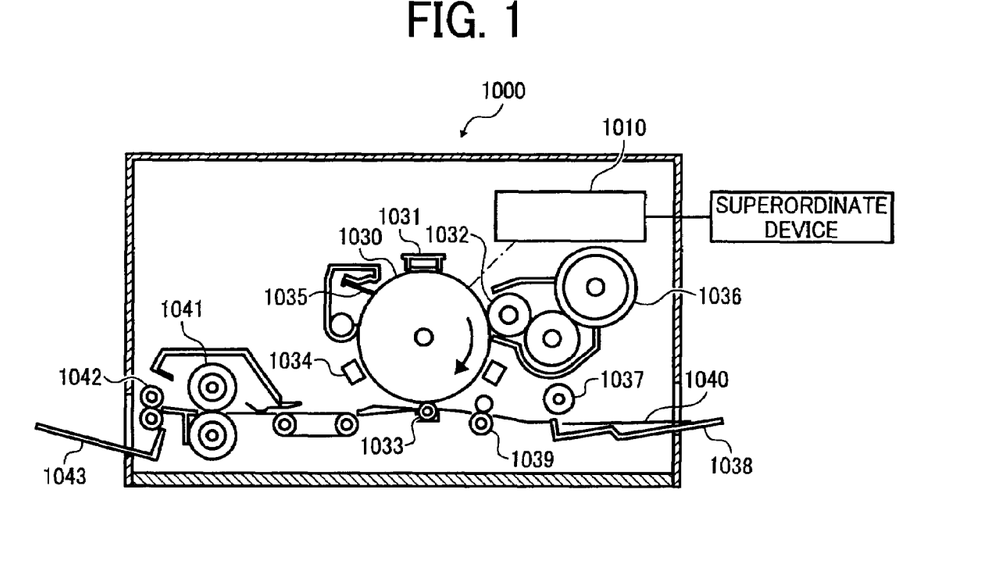
FIG. 1 describes a conceptual configuration of a laser printer according to a first embodiment of the present invention.

FIG. 1 illustrates a conceptual configuration of a printer 1000 as an image forming apparatus according to a first embodiment of the present invention.

The printer 1000 includes an optical scanning device 1010, a photosensitive drum 1030, a charger 1031, a development roller 1032, an image transference charger 1033, an electrical neutralization unit 1034, a cleaning blade 1035, a toner cartridge 1036, a paper feed roller 1037, a paper feed tray 1038, a pair of resist rollers 1039, a fixing roller 1041, a pair of paper discharge rollers 1042, and a paper discharge tray 1043.

A photosensitive layer is formed on a surface of the photosensitive drum 1030. Put another way, the surface of the photosensitive drum 1030 is a surface to be scanned. In the present circumstance, the photosensitive drum 1030 is configured so as to rotate in a direction that is denoted by an arrow in FIG. 1.

The charger 1031, the development roller 1032, the image transference charger 1033, the electrical neutralization unit 1034, and the cleaning blade 1035 are each respectively positioned so as to be adjacent to the surface of the photosensitive drum 1030. With regard to the direction of the rotation of the photosensitive drum 1030, a sequence of the positioning thereof is as follows: the charger 1031, the development roller 1032, the image transference charger 1033, the electrical neutralization unit 1034, the cleaning blade 1035 in turn.

The charger 1031 applies a uniform charge to the surface of the photosensitive drum 1030. The optical scanning device 1010 projects a light beam, which has been modulated in accordance with an image information from an upstream apparatus, for instance, a personal computer, upon the surface of the photosensitive drum 1030 that has been charged by the charger 1031. With regard to the surface of the photosensitive drum 1030, a latent image that corresponds to the image information is thereby formed upon the surface of the photosensitive drum 1030. In the present circumstance, the latent image that is formed moves in a direction of the development roller 1032, in line with the rotation of the photosensitive drum 1030. A configuration of the optical scanning device 1010 will be described hereinafter.

The toner cartridge 1036 stores a toner, and the toner thus stored is supplied to the development roller 1032.

The development roller 1032 causes the image information to generate a visible image by causing the toner that is supplied to the development roller 1032 from the toner cartridge 1036 to adhere to the latent image that is formed upon the surface of the photosensitive drum 1030. In the present circumstance, the latent image whereupon the toner has adhered (also to be referred to hereinafter as "toner image" for purposes of ease of designation) moves in a direction of the image transference charger 1033, in line with the rotation of the photosensitive drum 1030.

A recording paper 1040 is stored in the paper feed tray 1038. The paper feed roller 1037 is positioned in an immediate vicinity of the paper feed tray 1038, and the paper feed roller 1037 extracts the recording paper 1040 one sheet at a time from the paper feed tray 1038, and conveys the recording paper 1040 thus extracted to the pair of resist rollers 1039. The pair of resist rollers 1039 temporarily maintains the recording paper 1040 that is extracted by the paper feed roller 1037, and delivers the recording paper 1040 into a gap between the photosensitive drum 1030 and the image transference charger 1033, in accordance with the rotation of the photosensitive drum 1030.

A voltage is applied to the image transference charger 1033 that has an opposite polarity to a polarity of the toner that has adhered to the surface of the photosensitive drum 1030, in order to electrically attract the toner to the recording paper 1040. The toner image that is upon the surface of the photosensitive drum 1030 is thus transferred by the voltage to the recording paper 1040. The recording paper 1040 whereupon the toner image is thereby transferred is sent to the fixing roller 1041.

A heat and a pressure are applied to the recording paper 1040 by the fixing roller 1041, and the toner is thereby fixed upon the recording paper 1040. Upon being thus fixed, the recording paper 1040 is sent via the pair of paper discharge rollers 1042 to the paper discharge tray 1043, whereupon the recording paper 1040 is stacked in the order received.

The electrical neutralization unit 1034 neutralizes an electrical state of the surface of the photosensitive drum 1030.

The cleaning blade 1035 removes the toner that remains upon the surface of the photosensitive drum 1030, i.e., a residual toner. It is to be understood that the residual toner thus removed is to be reused. The surface of the photosensitive drum 1030 returns once more to a location of the charger 1031, upon the removal of the residual toner therefrom.

Following is a description of the configuration of the optical scanning device 1010.

Figure 2:
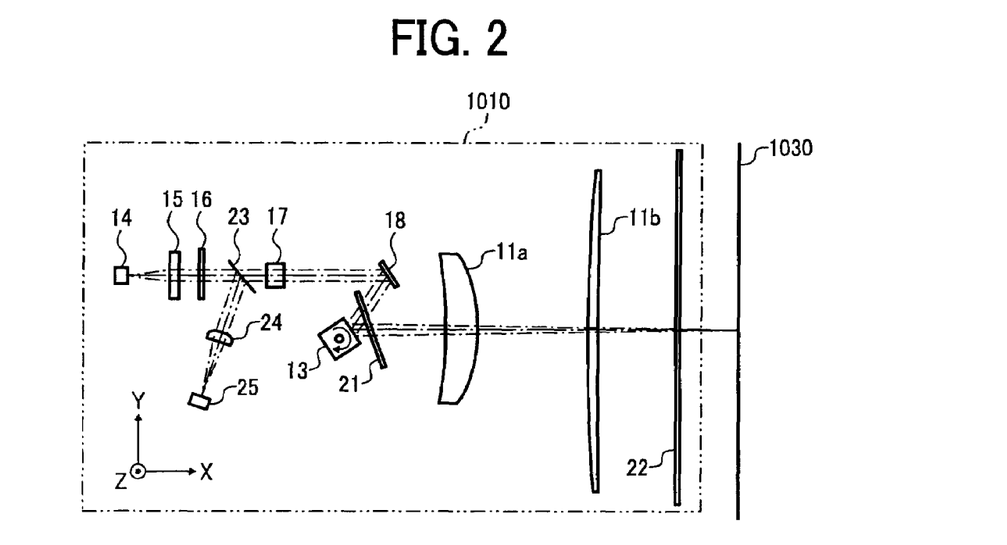
FIG. 2 is a conceptual diagram that depicts an optical scanning device that is shown in FIG. 1.

The optical scanning device 1010 comprises such components as a light source that emits a plurality of a light beam 14, a coupling lens 15, an aperture plate 16, a cylindrical lens 17, a reflecting mirror 18, a polygon mirror 13, a deflector scanning lens 11a, an image surface scanning lens 11b, a half mirror 23, an image forming lens 24, and a photodiode 25, such as is shown in FIG. 2. According to the present specification, it is to be understood that a y-axis direction is set to be a lengthwise direction of the photosensitive drum 1030, and that two directions that mutually intersect at right angles within a vertical plane of the y-axis direction are set to be a z-axis direction and an x-axis direction.

The light source 14 includes a plurality of a light emitting unit, an instance whereof would be a two-dimensional array of a vertical cavity surface emitting laser, or VCSEL, that is formed upon a substrate from 40 of the light emitting unit, and is treated as a two-dimensional array 100 hereinafter.

Figure 3:
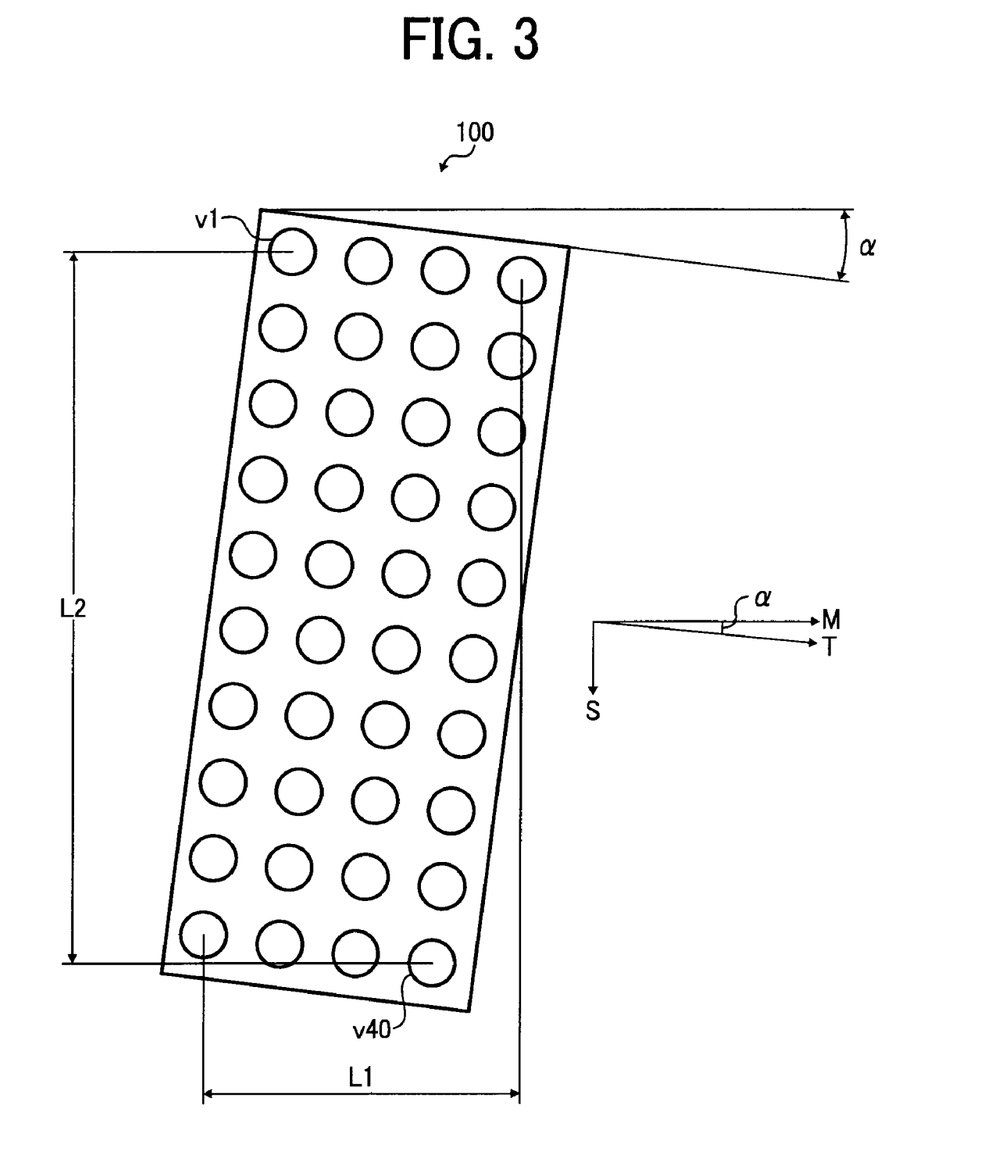
FIG. 3 describes a two-dimensional surface emitting laser array that is included within a light source that is shown in FIG. 2.

The two-dimensional array 100 includes 10 rows of a light emitting unit array wherein is positioned four of the light emitting unit, which are evenly spaced, from a direction that corresponds to a forward scanning direction (also to be referred to hereinafter as "direction M" for purposes of ease of designation) to a direction that corresponds to a sub or vertical scanning direction (also to be referred to hereinafter as "direction S" for purposes of ease of designation), in line with a direction that forms an angle of inclination α(also to be referred to hereinafter as "direction T" for purposes of ease of designation), such as is shown in FIG. 3. The 10 rows of the light emitting unit array is positioned at an even spacing in a direction that is orthogonal to the direction T. Put another way, the 40 light emitting units are arrayed in a matrix configuration. In the present circumstance, it is presumed that the 10 rows will be referred to as a first light emitting unit array, a second light emitting unit array, and so on, up to and including a tenth light emitting unit array, in order from the top of the page to the bottom of the page according to FIG. 3, for purposes of ease of designation.

An interval L1 between two of the light emitting units that are located at both ends with regard to the direction M is 270 μm, and an interval L2 between two of the light emitting units that are located at both ends with regard to the direction S is 320 μm. According to the present specification, it is to be understood that an interval between the light emitting units refers to a distance between centers of two light emitting units.

In order to identify each respective light emitting unit, a number v1 to v4 is assigned to the four light emitting units that configure the first light emitting unit array, a number v5 to v8 is assigned to the four light emitting units that configure the second light emitting unit array, and so on, up to and including a number v37 to v40 being assigned to the four light emitting units that configure the tenth light emitting unit array, in order from the top of the page to the bottom of the page according to FIG. 3, for purposes of ease of designation.

Figure 4:
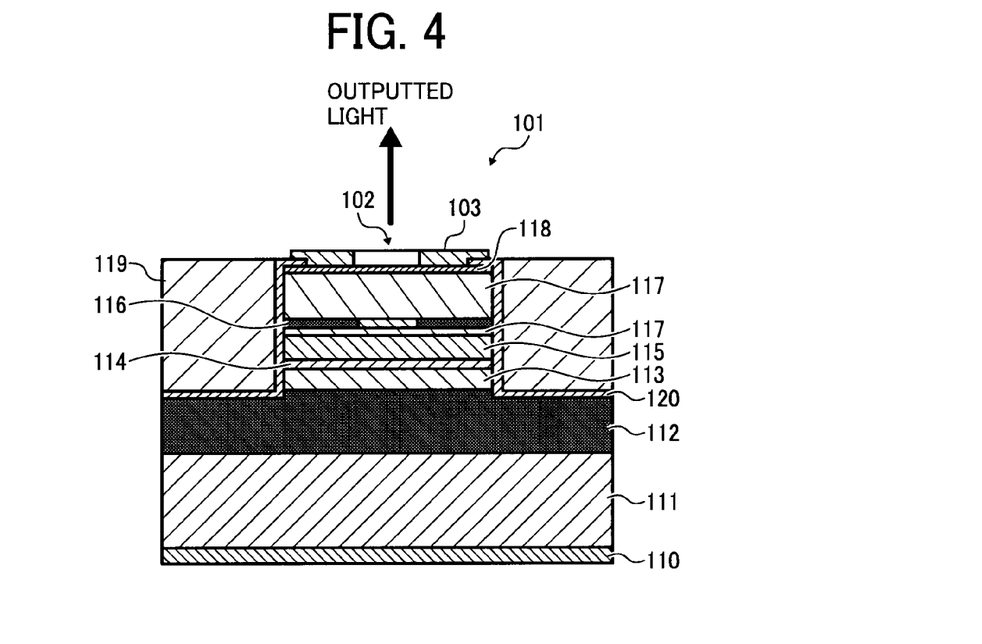
FIG. 4 describes a configuration of each respective light emitting unit according to the two-dimensional array that is shown in FIG. 3.

Each respective light emitting unit is designed with an emission wavelength of 782 nm, and as an instance, such as is shown in FIG. 4, a semiconductor layer such as a lower unit reflective mirror 112, a spacer layer 113, an active layer 114, a spacer layer 115, an upper unit reflective mirror 117, and a p contact layer 118, are stacked in order upon an n-GaAs substrate 111. It is to be understood that, for purposes of ease of designation, stacking a plurality of the semiconductor layer will also be referred to hereinafter as a stack. An enlargement of an immediate vicinity of the active layer 114 is shown in FIG. 5.

The lower unit reflective mirror 112 includes a 40.5 pair, comprising a low refractive index layer that is formed from n-$Al_{0.9}Ga_{0.1}As$ (hereinafter treated as a low refractive index layer 112a) and a high refractive index layer that is formed from n-$Al_{0.3}Ga_{0.7}As$ (hereinafter treated as a high refractive index layer 112b). If the emission wavelength is treated as λ, the optical thickness of each respective refractive index layer is set so as to be λ/4. It is to be understood that a composition incline layer (not shown) that gradually changes a composition from one composition to another composition is installed between the low refractive index layer 112a and the high refractive index layer 112b in order to minimize an electrical resistance therebetween.

The spacer layer 113 is formed from $Al_{0.6}Ga_{0.4}As$.

Figure 5:
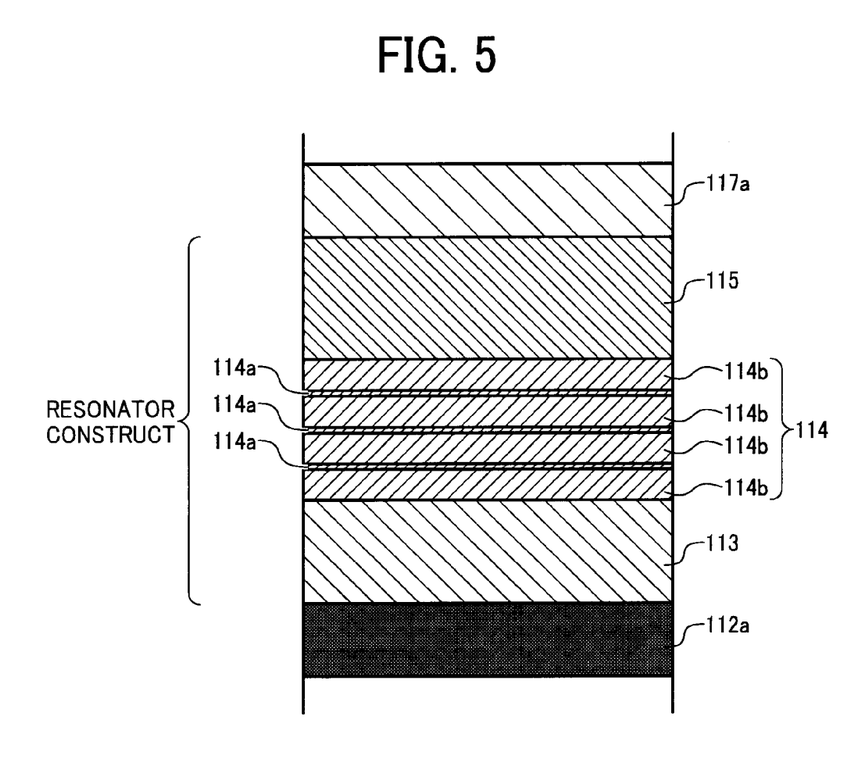
FIG. 5 is an enlargement of one portion of the light emitting unit that is shown in FIG. 4.

The active layer 114 includes a quantum well layer 114a, which is formed from $Al_{0.12}Ga_{0.88}As$, and a barrier 11b, which is formed from $Al_{0.3}Ga_{0.7}As$, such as is shown in FIG. 5. The spacer layer 115 is formed from $Al_{0.6}Ga_{0.4}As$. The portion of the stack that is formed from the spacer layer 113, the active layer 114, and the spacer layer 115 is also referred to as a resonator construct, and a thickness thereof is set so as to be the optical thickness of a single wavelength, wherein the wavelength λ=782 nm in the present circumstance; refer to FIG. 5.

The upper unit reflective mirror 117 includes a 24 pair, comprising a low refractive index layer that is formed from p-$Al_{0.9}Ga_{0.1}As$ (hereinafter treated as a low refractive index layer 117a) and a high refractive index layer that is formed from p-$Al_{0.3}Ga_{0.7}As$ (hereinafter treated as a high refractive index layer 117b). The optical thickness of each respective refractive index layer is set so as to be λ/4. It is to be understood that a composition incline layer (not shown) that gradually changes a composition from one composition to another composition is installed between the low refractive index layer 117a and the high refractive index layer 117b in order to minimize an electrical resistance therebetween.

A select oxide layer 116, which is formed from AlAs, is installed at a location that is at a λ/4 distance from the resonator construct with regard to the upper unit reflective mirror 117.

Following is a concise description of a method of manufacturing the two-dimensional array 100.

1. The stack is created by a crystal growth, employing either a Metal Organic Chemical Vapor Deposition (MOCVD) method, or a Molecular Beam Epitaxy (MBE) method.

2. A dry etching method is used to form a channel in each respective periphery of a plurality of regions that respectively form the light emitting unit, thereby forming what may be termed a mesa unit. In the present circumstance, an etching underside is set so as to extend through the lower unit reflective mirror 112. It is to be understood that it would be permissible if the etching underside were to exceed the select oxide layer 116, at a minimum. The select oxide layer 116 appears in a side wall of the channel as a result thereof. It is desirable for a size, i.e., a diameter, of the mesa to be 10 μm or more. The reason is that, if the diameter of the mesa is too small, a heat buildup will occur when the element is in operation, and a risk exists of a light emission characteristic incurring a negative impact. It is further desirable for a width of the channel to be 5 μm or more. The reason is that, if the width of the channel is too narrow, it becomes difficult to control the etching.

3. The stack whereupon the channel has been formed is heat processed in a steam vapor, and a portion of the select oxide layer 116 with regard to the mesa unit is selectively oxidized, and thereby changed into an insulator layer of $Al_xO_y$. In such a circumstance, the AlAs region that is not oxidized with regard to the select oxide layer 116 remains as a residue within a central portion of the mesa unit. An electrical current constrictor construct is formed thereby, which restricts a path of a driving electrical current of the light emitting unit to only the central portion of the mesa unit.

4. A $SiO_2$ protection layer of, for instance, a 150 nm thickness, is installed, except for a region that is formed by an upper portion electrode 103 and a light emission unit 102 of each respective mesa unit, and each respective channel is leveled out by being filled with a polyimide 119.

5. The upper portion electrode 103 is respectively formed in a region with regard to each respective mesa unit that excludes the light emission unit 102 upon the p contact layer 118, and a bonding pad (not shown) is formed in the periphery of each respective stack. Each respective wire (not shown) that joins each respective upper portion electrode 103 and the respective bonding pad that corresponds thereto is formed.

6. A lower portion electrode, i.e., an n-side common electrode, 110, is formed upon a reverse side of the stack.

7. The stack is cut into a plurality of chips.

Returning to FIG. 2, the coupling lens 15 treats the light beam that is projected from the light source 14 as being an approximately parallel light.

The aperture plate 16 is positioned upon a light path between the coupling lens 15 and the cylindrical lens 17, either in a focal location of a physical mass of the cylindrical lens 17, or in a location that is shifted toward the coupling lens 15 from the focal location of the physical mass of the cylindrical lens 17, and includes an aperture unit and a shutter unit that regulates, at a minimum, a diameter of a beam in the sub scan direction of the light beam that passes through the coupling lens 15.

The cylindrical lens 17 is positioned upon the light path between the aperture plate 16 and the reflecting mirror 18, and forms the light beam that passes through the aperture unit of the aperture plate 16 into an image, by way of the reflecting mirror 18, to an immediate vicinity of a deflector reflection surface of the polygon mirror 13, with regard to the sub scan direction. In the present circumstance, a focal length of the cylindrical lens 17 is 58 mm, and a distance from the aperture plate 16 to the cylindrical lens 17 is 62.5 mm.

Figure 6:
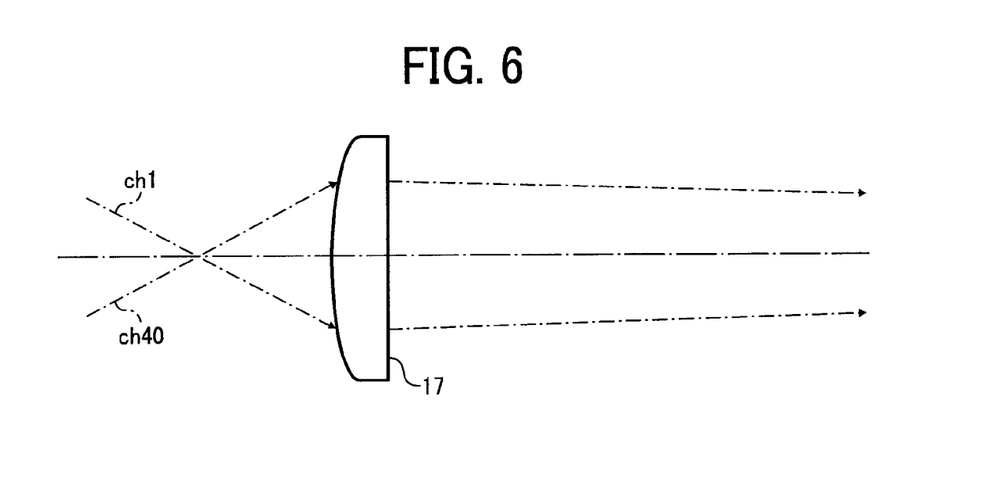
FIG. 6 describes a light path of each respective principal ray ch 1 and ch 40 after passing through a cylindrical lens.

For instance, such as is shown in FIG. 6, each respective principal ray of a light beam that is projected from the light emission unit v1 (also to be referred to hereinafter as "ch 1" for purposes of ease of designation) and of a light beam that is projected from the light emission unit v40 (also to be referred to hereinafter as "ch 40" for purposes of ease of designation) advances so as to mutually converge upon one another after passing through the cylindrical lens 17.

Figure 7:
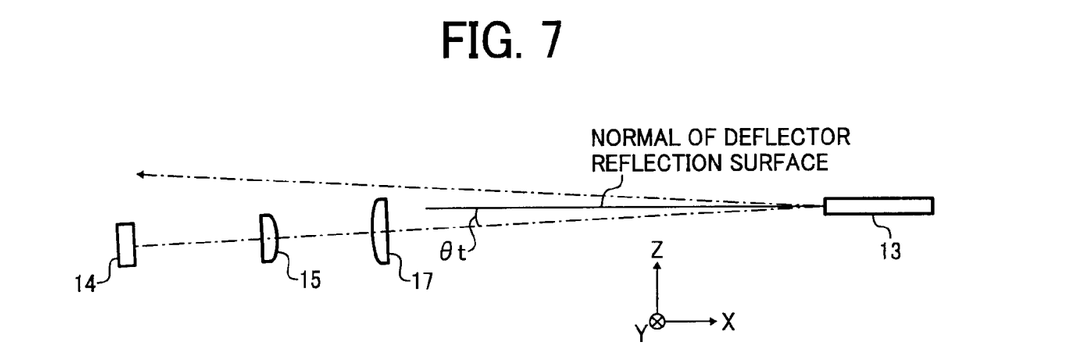
FIG. 7 describes a slope of an optical axis of an optical assembly prior to a deflector with regard to a deflector reflection surface of a polygon mirror.

As another instance, such as is shown in FIG. 7, an optical axis of the coupling lens 15 and the cylindrical lens 17 is positioned so as to be inclined by an angle θt to a normal of the deflector reflection surface of the polygon mirror 13, with regard to the sub scan direction. In the present circumstance, as an instance, the θt is 0.70 degrees. Put another way, the optical assembly before the deflector is what might be described as an incident angle optical assembly. It is to be understood that, with regard to FIG. 7, in order to simplify the description thereof, the light path that travels from the reflecting mirror 18 to the polygon mirror 13 is rotated and made to match the x-axis direction, for purposes of ease of description.

Figure 8A:
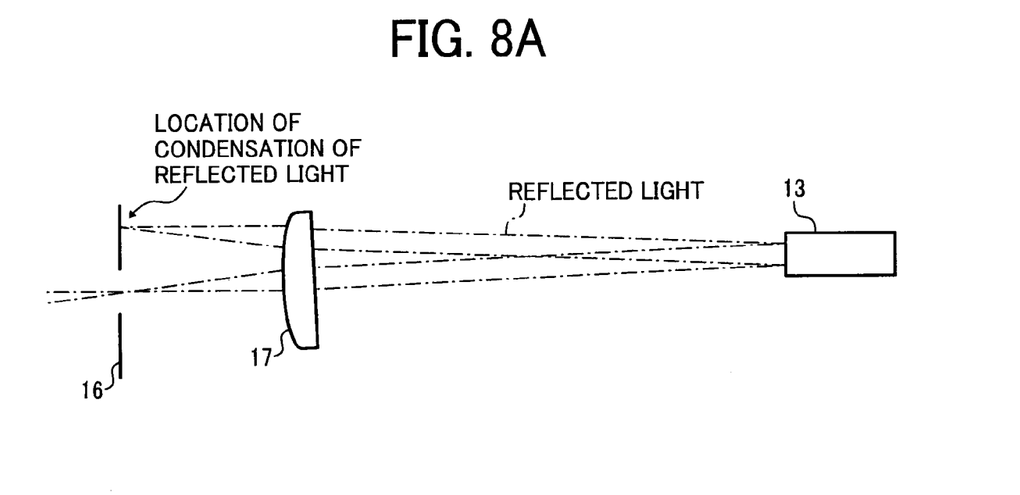
FIG. 8A describes a light path of a reflected light that travels toward the light source from the deflector reflection surface according to the embodiment that is shown in FIG. 1.

As a result thereof, the light beam that is emitted from the light source 14 is incident to the deflector reflection surface with an incline to the normal of the deflector reflection surface, i.e., the incident angle thereof. In such a circumstance, for instance, such as is shown in FIG. 8A, the light beam that is reflected by the deflector reflection surface is condensed in an immediate vicinity of the aperture plate 16, and is shuttered by the shutter unit of the aperture plate 16. Accordingly, it is possible to restrain the light beam that is reflected by the deflector reflection surface from returning toward the light source.

Figure 8B:
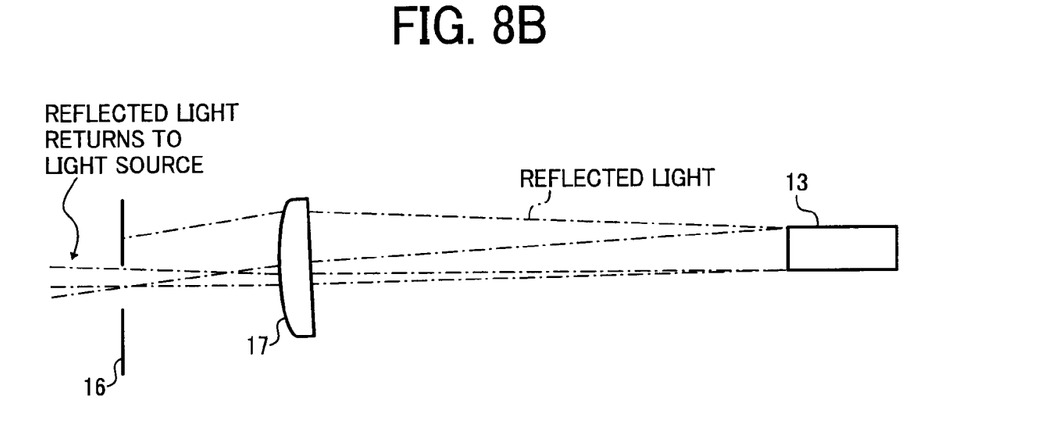
FIG. 8B describes a light path of a reflected light that travels toward the light source from a conventional deflector reflection surface.

It is to be understood that if each respective principal ray ch 1 and ch 40 advance so as to mutually diverge from one another after passing through the cylindrical lens 17, then, for instance, such as is shown in FIG. 8B, there is a risk that a portion of the light beam that is reflected by the deflector reflection surface may pass through the aperture unit of the aperture plate 16 and return toward the light source.

Figure 9:
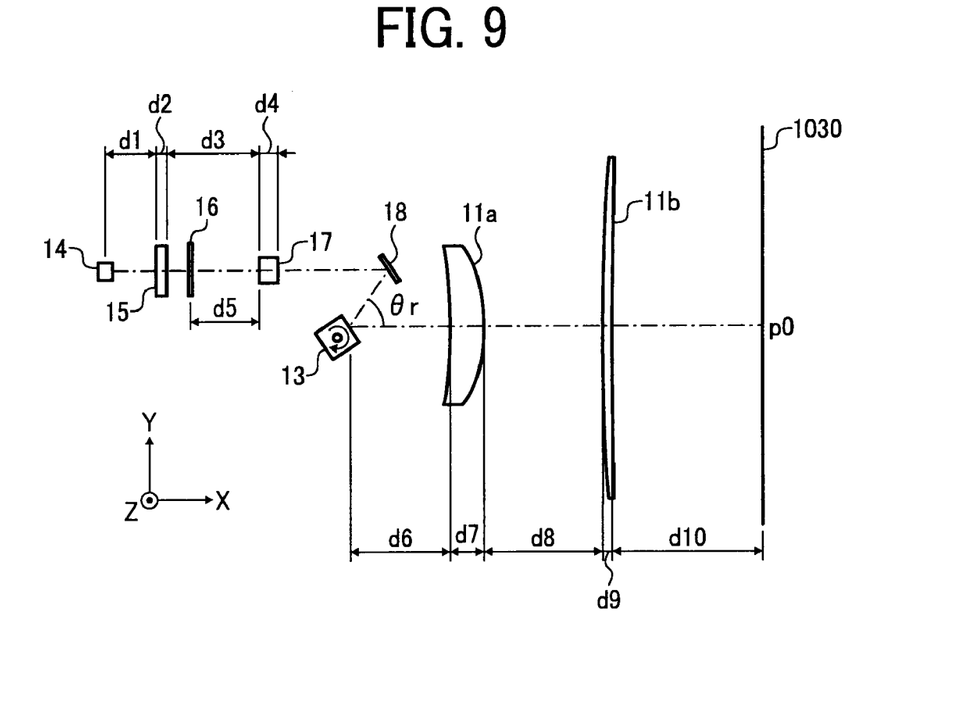
FIG. 9 describes a relation of a location of a primary optical element with regard to the optical scanning device that is shown in FIG. 2.

An angle, i.e., a θr with regard to FIG. 9, that is formed from a direction of an incidence of the light beam from the reflecting mirror 18 to the polygon mirror 13 and a direction of a progression of the light beam that is reflected toward a location of an image height zero with regard to the surface of the photosensitive drum 1030 by way of the deflector reflection surface of the polygon mirror 13, i.e., a location of a reference numeral p0 with regard to FIG. 9, is 64.0 degrees.

It is to be understood that the optical assembly that is positioned between the light source 14 and the polygon mirror 13 is also referred to as the optical assembly prior to the deflector. According to the embodiment, the optical assembly prior to the deflector is configured from the coupling lens 15, the aperture plate 16, the cylindrical lens 17, and the reflecting mirror 18.

Returning to FIG. 2, a soundproof glass 21 is positioned between the cylindrical lens 17 and the polygon mirror 13, and between the polygon mirror 13 and the deflector scanning lens 11a.

The polygon mirror 13 includes, as an instance, a quad surface mirror with an inscribed circle with a 7 mm radius, and each respective mirror surface constitutes a deflector reflection surface. The polygon mirror 13 deflects the light beam from the reflecting mirror 18, while rotating at a uniform velocity around an axis that is parallel to the z-axis direction.

The deflector scanning lens 11a is positioned upon the light path of the light beam that is deflected by the polygon mirror 13. In the present circumstance, as an instance, the incidence surface, i.e., the first surface, of the deflector scanning lens 11a is in a location with regard to the polygon mirror 13 that is 46.41 mm in the direction of the x-axis, i.e., a reference numeral d6 with regard to FIG. 9, and −0.65 mm in the direction of the z-axis. The incidence surface, i.e., the first surface, of the deflector scanning lens 11a is inclined by 2.50 degrees with regard to the sub scan direction.

The image surface scanning lens 11b is positioned upon the light path of the light beam that passes through the deflector scanning lens 11a. In the present circumstance, as an instance, an incidence surface, i.e., a third surface, of the image surface scanning lens 11b is in a location with regard to an emergence surface, i.e., a second surface, of the deflector scanning lens 11a that is 89.74 mm in the direction of the x-axis, i.e., a reference numeral d8 with regard to FIG. 9, and −0.76 mm in the direction of the z-axis. The incidence surface, i.e., the third surface, of the image surface scanning lens 11b is inclined by 0.70 degrees with regard to the sub scan direction.

As another instance, the optical scanning device 1010 is positioned such that a distance, i.e., a reference numeral d10 with regard to FIG. 9, from an emergence surface, i.e., a fourth surface, of the image surface scanning lens 11b to the photosensitive drum 1030 is 143.46 mm in the direction of the x-axis. It is to be understood that a sheet of dustproof glass 22 (refer to FIG. 2) 1.9 mm thick, and with a refractive index of 1.5112, is positioned between the image surface scanning lens 11b and the photosensitive drum 1030.

Each surface of both the deflector scanning lens 11a and the image surface scanning lens 11b has an aspherical shape, and each such surface includes a non-circular arc shape that is shown by the following equations (1) and (2). A refractive index of each respective scanning lens is 1.5240.

$$X(Y \cdot Z) = \frac{\frac{Y^2}{R_m}}{1 + \sqrt{1 - (1+K) \cdot \left(\frac{Y}{R_m}\right)^2}} + A_1 \cdot Y + A_2 \cdot Y^2 + A_3 \cdot Y^3 + \qquad (1)$$

$$A_4 \cdot Y^4 + A_5 \cdot Y^5 + A_6 \cdot Y^6 \ldots + \frac{Cs(Y) \cdot Z^2}{1 + \sqrt{1 - (Cs(Y) \cdot Z)^2}} +$$

$$(F_0 + F_1 \cdot Y + F_2 \cdot Y^2 + F_3 \cdot Y^3 + F_4 \cdot Y^4 + F_5 \cdot Y^5 + F_6 \cdot Y^6 \ldots) \cdot Z$$

$$Cs(Y) = \frac{1}{R_s} + B_1 \cdot Y + B_2 \cdot Y^2 + B_3 \cdot Y^3 + B_4 \cdot Y^4 + B_5 \cdot Y^5 + B_6 \cdot Y^6 \ldots \qquad (2)$$

In the present circumstance, X is a depth of the optical axis direction, Rm is a radius of paraxial curvature of the forward scanning direction, R5 is a radius of paraxial curvature of the sub scanning direction, Y is a distance of the forward scanning direction from the optical axis, Z is a distance of the sub scanning direction from the optical axis, K is a conic constant, and A1, A2, A3, A4, A5, . . . , F0, F1, F2, F3, F4, F5, . . . , and B1, B2, B3, . . . are all coefficients.

Each respective value with regard to the incidence surface, i.e., the first surface, and the emergence surface, i.e., the second surface, of the deflector scanning lens 11a is denoted in Table 1:

TABLE 1

| | Deflector Scanning Lens | |
|---|---|---|
| | First Surface | Second Surface |
| $R_m$ | −119.543 | −59.279 |
| $R_s$ | ∞ | ∞ |
| K | 0 | 0 |
| $A_4$ | $8.795 \times 10^{-7}$ | $9.224 \times 10^{-7}$ |
| $A_6$ | $-2.536 \times 10^{-10}$ | $6.778 \times 10^{-11}$ |
| $A_8$ | $1.627 \times 10^{-14}$ | $-4.112 \times 10^{-14}$ |
| $A_{10}$ | $1.505 \times 10^{-17}$ | $1.373 \times 10^{-17}$ |
| $A_{12}$ | $-3.135 \times 10^{-21}$ | $2.070 \times 10^{-21}$ |
| $B_2$ | $5.073 \times 10^{-6}$ | 0 |
| $B_4$ | $1.302 \times 10^{-8}$ | 0 |
| $B_6$ | $-3.039 \times 10^{-11}$ | 0 |
| $B_8$ | $2.543 \times 10^{-14}$ | 0 |
| $B_{10}$ | $-8.067 \times 10^{-18}$ | 0 |

Each respective value with regard to the incidence surface, i.e., the third surface, and the emergence surface, i.e., the fourth surface, of the image surface scanning lens 11b is denoted in Table 2, following:

TABLE 2

| | Image Surface Lens | |
|---|---|---|
| | Third Surface | Fourth Surface |
| $R_m$ | −10000.000 | 540.625 |
| $R_s$ | ∞ | −37.98 |
| K | 0 | 0 |
| $A_4$ | $3.286 \times 10^{-7}$ | $1.278 \times 10^{-7}$ |
| $A_6$ | $-7.085 \times 10^{-11}$ | $-4.629 \times 10^{-11}$ |
| $A_8$ | $6.269 \times 10^{-15}$ | $4.049 \times 10^{-15}$ |
| $A_{10}$ | $-2.732 \times 10^{-7}$ | $-1.660 \times 10^{-19}$ |
| $A_{12}$ | $4.739 \times 10^{-24}$ | $2.585 \times 10^{-24}$ |
| $B_2$ | 0 | $1.276 \times 10^{-6}$ |
| $B_4$ | 0 | $-7.383 \times 10^{-11}$ |
| $B_6$ | 0 | $-1.356 \times 10^{-14}$ |
| $B_8$ | 0 | $2.162 \times 10^{-18}$ |
| $B_{10}$ | 0 | $-9.171 \times 10^{-23}$ |

TABLE 2-continued

| | Image Surface Lens | |
|---|---|---|
| | Third Surface | Fourth Surface |
| $F_2$ | $-2.859 \times 10^{-7}$ | 0 |
| $F_4$ | $2.911 \times 10^{-10}$ | 0 |
| $F_6$ | $-8.776 \times 10^{-14}$ | 0 |
| $F_8$ | $1.081 \times 10^{-17}$ | 0 |
| $F_{10}$ | $-4.663 \times 10^{-22}$ | 0 |

It is to be understood that the optical assembly that is positioned upon the light path between the polygon mirror 13 and the photosensitive drum 1030 is also referred to as a scanning optical assembly. According to the embodiment, the scanning optical assembly is configured from the deflector scanning lens 11a and the image surface scanning lens 11b. A lateral magnification of the scanning optical assembly with regard to the sub scan direction is −1.00.

An optical element wherein the maximum positive power in the sub scan direction with regard to the scanning optical assembly is at a maximum is the image surface scanning lens 11b, and the principal ray ch 1 and the principal ray ch 40 is so as not to intersect between the cylindrical lens 17 and the image surface scanning lens 11b.

It is to be understood that a length of an effective scanning region with regard to the photosensitive drum 1030, i.e., a writing width in the forward scanning direction, is 323 mm. A semi-angle of view is 31.0 degrees.

A location relationship of each respective optical element is shown in FIG. 9. An instance of a concrete value (in mm) of the reference numerals d1 to d10 with regard to FIG. 9 is denoted in Table 3, following:

TABLE 3

| d1 | d2 | d3 | d4 | d5 | d6 | d7 | d8 | d9 | d10 |
|---|---|---|---|---|---|---|---|---|---|
| 41.9 | 3.8 | 77.5 | 3.0 | 62.5 | 46.41 | 13.50 | 89.74 | 3.0 | 143.46 |

The half mirror 23, which is positioned upon the light path between the aperture plate 16 and the cylindrical lens 17, reflects a portion of the light beam that passes through the aperture unit of the aperture plate 16. A ratio of a quantity of transmitted light and a quantity of reflected light with regard to the half mirror 23 is set to be any of 9:1, 8:2, or 7:3.

The image forming lens 24 condenses the light beam that is reflected by the half mirror 23. The photodiode 25, which is positioned in an immediate vicinity of a location of the condensation of the light beam thereof, outputs a signal that corresponds to a quantity of light thus received, i.e., an optoelectric transformation signal. The output signal of the photodiode 25 is employed in monitoring a quantity of light that is projected from each respective light emitting unit, and the driving electrical current of each respective light emitting unit is corrected in accordance with a result of the monitoring thereof.

It is to be understood that the sub scan beam pitch may deviate from the desired value even when the light emitting unit is arrayed with a high density in the two-dimensional array, owing to such as the error of the location of the optical element, or the error in the shape of the optical element.

A hazard is present wherein the deviation of the sub scan beam pitch may have a negative effect on the quality of the image, and, consequently, it is necessary to maintain the sub scan beam pitch in a stable condition.

Figure 10:
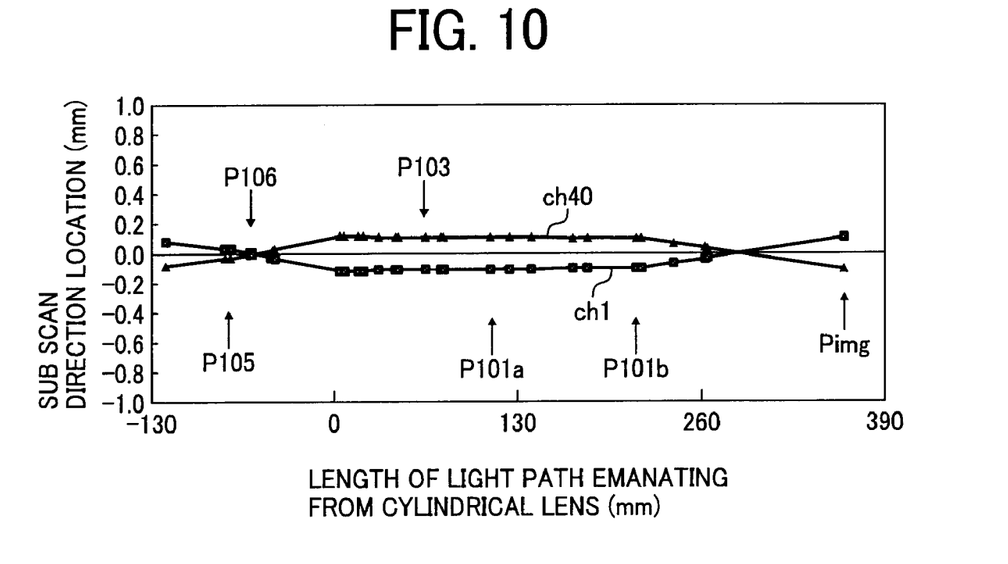
FIG. 10 describes the light path of the principal ray ch 1 and ch 40 according to the embodiment that is shown in FIG. 1.

FIG. 10 depicts the light path of the principal ray ch 1 and the light path of the principal ray ch 40 according to the embodiment. As shown in FIG. 10, reference numeral P105 denotes the location of the coupling lens 15, reference numeral P106 denotes the location of the aperture plate 16, reference numeral P103 denotes the location of the polygon mirror 13, reference numeral P101a denotes the location of the scanning lens 11a, reference numeral P101b denotes the location of the scanning lens 11b, and reference numeral Pimg denotes the location of the image surface.

According to the embodiment, each respective principal ray ch 1 and ch 40 is set so as to mutually converge with one another, and so as not to intersect between the cylindrical lens 17 and the image surface scanning lens 11b, after passing through the cylindrical lens 17, and it is possible, as a consequence, to reduce an angle of incidence of each respective principal ray with respect to the photosensitive drum 1030. In the present circumstance, the angle of incidence of the principal ray ch 1 at the image height zero mm is 0.083 degrees, and the angle of incidence of the principal ray ch 40 at the image height zero mm is −0.083 degrees. A change in the sub scan beam pitch when the image surface location with regard to the direction of the progression of the light deviates by 1 mm is 2.9 µm.

Figure 11:
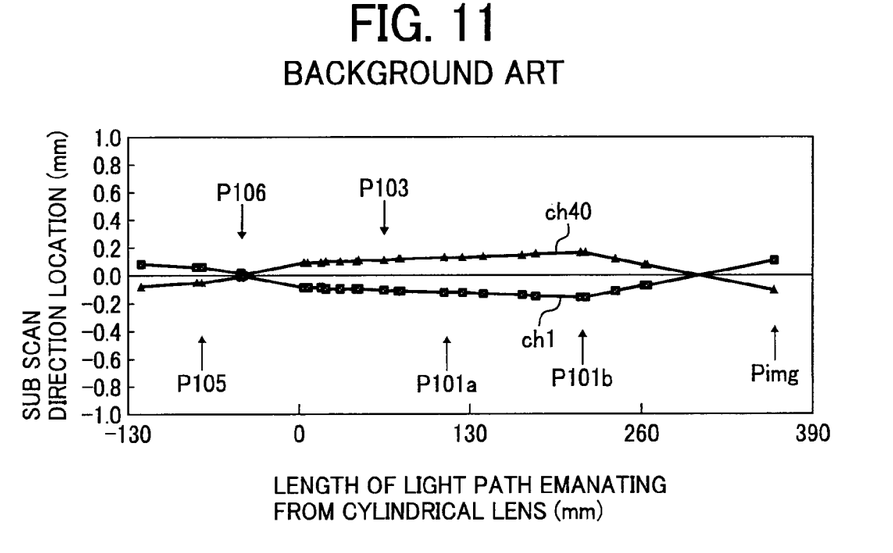
FIG. 11 describes a light path of the principal ray ch 1 and ch 40 according to a conventional technology.

For comparison purposes, the light path of each respective principal ray ch 1 and ch 40 when the distance between the aperture plate 16 and the cylindrical lens 17 is 47.53 mm is shown in FIG. 11. In such a circumstance, each respective principal ray ch 1 and ch 40 progresses so as to mutually diverge from one another after passing through the cylindrical lens 17, the angle of incidence of the principal ray ch 1 at the image height zero mm is 0.102 degrees, and the angle of incidence of the principal ray ch 40 at the image height zero mm is −0.102 degrees. The change in the sub scan beam pitch when the image surface location with regard to the direction of the progression of the light deviates by 1 mm is 3.6 µm.

Thus, according to the embodiment, it is possible to reduce the change in the sub scan beam pitch, even when the error of the location of the optical element, or the error in the shape of the optical element, is present. In such a circumstance, the light beam passes through the immediate vicinity of the optical axis of each respective scanning lens of the scanning optical assembly in the sub scan direction, thereby improving other optical characteristics as well.

As described herein, the optical scanning device 1010 according to the embodiment comprises the light source 14 that includes the plurality of the light emission unit, the polygon mirror 13 that deflects the light beam that is emitted from the light source 14, the cylindrical lens 17 that is positioned upon the light path of the light beam that is emitted from the light source 14 toward the polygon mirror 13, and which causes the light beam that is emitted from the light source 14 to form the image in the immediate vicinity of the polygon mirror 13 with regard to the sub scan direction, and the scanning optical assembly that conducts the light beam that is deflected with the polygon mirror 13 to the photosensitive drum 1030. Each respective principal ray ch 1 and ch 40 is set so as to mutually converge with one another, and so as not to intersect between the cylindrical lens 17 and the image surface scanning lens 11b, after passing through the cylindrical lens 17. Thus, it is possible to reduce the fluctuation in the sub scan beam pitch that results from the error of the location of the optical element that is positioned between the light source 14 and the photosensitive drum 1030, or the error in the shape of the optical element thus positioned. Accordingly, as a result, it becomes possible to reduce the deviation in the sub scan beam pitch.

According to the embodiment, the so-called multi-beam light source is employed, and as a consequence, it is possible to achieve both a higher resolution and a higher speed.

The laser printer 1000 according to the embodiment comprises the optical scanning device 1010 that is capable of reducing the deviation in the sub scan beam pitch, and as a consequence, it becomes possible to form the image with the high image quality at high speed as a result.

Whereas a circumstance has been described according to the embodiment wherein each respective principal ray ch 1 and ch 40 advances so as to mutually converge with one another after passing through the cylindrical lens 17, the present invention is not restricted thereto, and it would be permissible for each respective principal ray ch 1 and ch 40 to advance in parallel.

Whereas a circumstance has been described according to the embodiment wherein the shape of each respective mesa unit of the two-dimensional array 100 is circular, the present invention is not restricted thereto, and it would be permissible, for instance, for each respective mesa unit of the two-dimensional array 100 to be an arbitrary shape, such as an elliptical shape, a square shape, or a rectangular shape.

Whereas a circumstance has been described according to the embodiment wherein the number of the light emission unit that configures one of the light emission unit array is four, and the number of the light emission unit array is 10, the present invention is not restricted thereto.

Whereas a circumstance has been described according to the embodiment wherein the wavelength of the laser light that is projected from each respective light emission unit is in the 780 nm band, the present invention is not restricted thereto, and any wavelength that corresponds to a sensitivity property of the photosensitive drum 1030 would be permissible. It is to be understood that in such a circumstance, either a portion of a material that configures each respective light emission unit, at a minimum, or a portion of a configuration of each respective light emission unit, at a minimum, is changed in response to the emission wavelength.

Whereas a circumstance has been described according to the embodiment wherein the light beam that is emitted from the light source 14 is incident to the deflector reflection surface at an incline with regard to the sub scanning direction, the present invention is not restricted thereto.

Whereas a circumstance has been described according to the embodiment wherein the image forming apparatus is the laser printer 1000, the present invention is not restricted thereto. In essence, provided that the image forming apparatus comprises the optical scanning device 1010, it would be possible to form the image with the high image quality at high speed as a result.

It would be possible to form the image with the high image quality at high speed even with regard to a image forming apparatus that forms a color image, by employing an optical scanning device that supports the color image.

Figure 12:
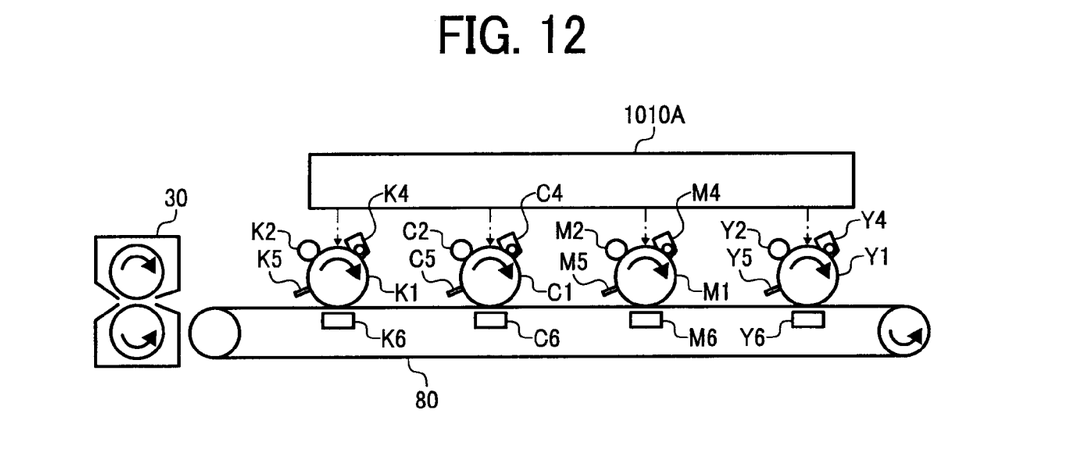
FIG. 12 describes a conceptual configuration of a tandem color device.

As an instance thereof, a tandem color device that is capable of forming a multi-color image is shown in FIG. 12. The tandem color device comprises such as a photosensitive drum K1, a charging unit K2, a development unit K4, a cleaning unit K5, and a transference charging unit K6, for black (K) printing, a photosensitive drum C1, a charging unit C2, a development unit C4, a cleaning unit C5, and a transference charging unit C6, for cyan (C) printing, a photosensitive drum M1, a charging unit M2, a development unit M4, a cleaning unit M5, and a transference charging unit M6, for magenta (M) printing, a photosensitive drum Y1, a charging unit Y2, a development unit Y4, a cleaning unit Y5, and a transference charging unit Y6, for yellow (Y) printing, an optical scanning device 1010A, a transference belt 80, and a fixing unit 30.

The optical scanning device 1010A includes on a per color basis, a light source, an optical assembly prior to a deflector, and a scanning optical assembly, in a manner similar to the optical scanning device 1010.

The optical scanning device 1010A uses a light beam that is modulated in response to a black (K) image information to scan the photosensitive drum K1, a light beam that is modulated in response to a cyan (C) image information to scan the photosensitive drum C1, a light beam that is modulated in response to a magenta (M) image information to scan the photosensitive drum M1, and a light beam that is modulated in response to a yellow (Y) image information to scan the photosensitive drum Y1.

Each respective charging unit uniformly charges the photosensitive drum that corresponds thereto. The light beam is projected, by the optical scanning device 1010A, upon a surface of the photosensitive drum that is charged by the charging unit, and an electrostatic latent image is formed upon the photosensitive drum. A toner image is formed upon the surface of the photosensitive drum by the development unit that corresponds thereto. The toner image for each respective color is transferred to a recording paper by the transference charging unit that corresponds thereto, and the image is fixed upon the recording paper by the fixing unit 30.

Whereas a color misalignment may occur with each respective color of the tandem color device, owing to such as a precision of the machine, the optical scanning device 1010A includes a high density two-dimensional surface emitting laser array, and, as a consequence, it is possible to increase a precision of a correction of the color misalignment with each respective color thereof by selecting the surface emitting laser to light up.

It is to be understood that it would be permissible to install, as a substitute for the optical scanning device 1010A, an optical scanning device that includes an optical assembly prior to the deflector and an scanning optical assembly that is similar to the optical assembly prior to the deflector and the scanning optical assembly that is included in the optical scanning device 1010A.

It would also be permissible for the image forming apparatus to be a image forming apparatus that employs a silver halide film as an image retention medium. In such a circumstance, the latent image is formed upon the silver halide film by the optical scan, and it is possible to make the latent image visible by a process that is equivalent to a process of developing with regard to a conventional silver halide photographic process. It is possible to transfer a resulting image to a photographic printing paper by a process that is equivalent to a conventional process of photographic printing with regard to a conventional silver halide photographic process. It would be possible to carry out such a image forming apparatus as an optical plate making device or an optical drawing device imaging an image such as a CT scan image.

It would also be permissible for the image forming apparatus to be a image forming apparatus that employs a color development medium, i.e., a positive photographic printing paper that produces a color by way of a thermal energy of a spot beam, as the image retention medium. In such a circumstance, it would be possible to form a visible image directly upon the image retention medium by way of the optical scanning.

As described herein, the optical scanning device according to the present invention is suited to reducing the deviation of the sub scan beam pitch. The image forming apparatus according to the present invention is suited to forming the high quality image at a high speed.

Although the preferred embodiments of the present invention have been described, it is to be understood that the present invention is not limited to the present embodiments, and that it would be permissible to allow various modifications and changes that can be made to the embodiments.

What is claimed is:

1. An optical scanning device, comprising:
a light source configured to emit a plurality of light beams;
a deflector configured to deflect the plurality of light beams emitted from the light source;
a first optical assembly configured to be positioned upon a light path of the plurality of light beams that travel from the light source to the deflector, and configured to cause the plurality of light beams emitted from the light source to form an image in a sub scanning direction, in an immediate vicinity of the deflector; and
a second optical assembly configured to cause the plurality of light beams deflected by the deflector to form the image upon a surface to be scanned;
wherein the first optical assembly is configured to set the plurality of light beams such that a principal ray of two of the plurality of the light beams, which are located at each respective terminus with regard to the sub scanning direction, mutually converge with one another and do not intersect between an optical element with regard to the second optical assembly, and
wherein a positive power in the sub scanning direction is at a maximum and the first optical assembly.

2. The optical scanning device according to claim 1, wherein:
the light source includes a plurality of a light emission units, and the plurality of the light beams are emitted from the plurality of the light emission units thereof.

3. The optical scanning device according to claim 1, further comprising:
an aperture plate configured to be positioned between the light source and the first optical assembly, either in a focal location of a physical mass of the first optical assembly, or in a location that is shifted toward the light source from the focal location of the physical mass of the first optical assembly, and that is configured to include an aperture unit and a shutter unit so as to shape the light beam that is emitted from the light source.

4. The optical scanning device according to claim 3,
wherein the deflector includes a deflector reflection surface;
wherein light beams that are incident to the deflector are at a minimum, incident to the deflector at an incline to a normal of the deflector reflection surface, with regard to the sub scanning direction; and
wherein a light beam that travels from the deflector to the light source is shuttered by the shutter unit of the aperture plate.

5. The optical scanning device according to claim 1, wherein:
the plurality of the light emission units of the light source include a surface emitting laser array that is arrayed in a two-dimensional manner.

6. An image forming apparatus, comprising:
at a minimum, one image retention medium; and
at a minimum, one optical scanning device according to claim 1, configured to scan a light beam wherein is contained an image information with regard to the minimum of one image retention medium.

7. The image forming apparatus according to claim 6, wherein:

the image information is a multi-color image information.

8. The optical scanning device according to claim 2, wherein:

the plurality of a light emission units includes a first terminal light emission unit and a second terminal light emission unit, such that the two of the plurality light beams that are located at each respective terminus with regard to the sub scanning direction are respectively emitted by the first and second terminal light emission units.

9. An image forming apparatus, comprising:

an image retention medium, and a plurality of optical scanning devices, each of which includes, a light source configured to emit a plurality of light beams;

a deflector configured to deflect the light beams emitted from the light source;

a first optical assembly configured to be positioned upon a light path of the light beams that travel from the light source to the deflector, and configured to cause the light beams emitted from the light source to form an image in a sub scanning direction, in an immediate vicinity of the deflector; and a second optical assembly configured to cause the light beams deflected by the deflector to form the image upon a surface to be scanned;

wherein the first optical assembly is configured to set the plurality of light beams such that a principal ray of two of the plurality of the light beams, which are located at each respective terminus with regard to the sub scanning direction, mutually converge with one another and do not intersect between an optical element with regard to the second optical assembly.

10. The image forming device according to claim 9, wherein:

the light source includes a plurality of a light emission units, and the plurality of the light beams are emitted from the plurality of the light emission units thereof.

11. The image forming device according to claim 9, further comprising:

an aperture plate configured to be positioned between the light source and the first optical assembly, either in a focal location of a physical mass of the first optical assembly, or in a location that is shifted toward the light source from the focal location of the physical mass of the first optical assembly, and that is configured to include an aperture unit and a shutter unit so as to shape the light beam that is emitted from the light source.

12. The image forming device according to claim 11, wherein the deflector includes a deflector reflection surface;

wherein light beams that are incident to the deflector are, at a minimum, incident to the deflector at an incline to a normal of the deflector reflection surface, with regard to the sub scanning direction; and wherein a light beam that travels from the deflector to the light source is shuttered by the shutter unit of the aperture plate.

13. The image forming device according to claim 9, wherein:

the plurality of the light emission units of the light source include a surface emitting laser array that is arrayed in a two-dimensional manner.

14. The image forming device according to claim 10, wherein:

the plurality of a light emission units includes a first terminal light emission unit and a second terminal light emission unit, such that the two of the plurality light beams that are located at each respective terminus with regard to the sub scanning direction are respectively emitted by the first and second terminal light emission units.

* * * * *